Feb. 23, 1932.   J. SORGE   1,846,916

CONNECTION FOR LINE PROTECTION RELAYS FOR THREE-PHASE CURRENT

Filed March 1, 1928

INVENTOR
JOACHIM SORGE
BY
Socka, Kehlenbek & Parker
ATTORNEYS.

Patented Feb. 23, 1932

1,846,916

UNITED STATES PATENT OFFICE

JOACHIM SORGE, OF BERLIN-CHARLOTTENBURG, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

CONNECTION FOR LINE PROTECTION RELAYS FOR THREE-PHASE CURRENT

Application filed March 1, 1928, Serial No. 258,241, and in Germany March 5, 1927.

This invention relates to a connection for line protection for three phase current.

In order to make it possible to ascertain as quickly as possible any fault in electric lines, caused by a short circuit, or even automatically to switch off the faulty line sections, relays are used which are controlled by the voltage as well as by the strength of current passing through the lines. In their most perfect form, such relays measure the quotient of voltage and strength of current, in other words therefore the resistance of the line. The lines are set to the reactance or apparent resistance. When the resistance of the faulty circuit is known, it is possible to deduce therefrom also the distance of the faulty place itself; for the resistance of the short circuit itself can be neglected, more particularly when the relay is operated by the reactance, and when the values measured at the first moment after the occurrence of the fault are taken as the basis. In the case of indicating instruments, whether automatic switching-off of the faulty section be combined therewith or not, the scale can be calibrated, instead of in ohms, directly in units of length, so that it will indicate directly the distance of the fault from the point at which the relay is located. In the case of three phase lines there is a difficulty inasmuch as both two-phase short circuits and three-phase short circuits can occur. The path of current and the influence on the voltage are so different in these two cases that a correct calibration of the scale for a two-phase short circuit does not by any means ensure correct indications for a three-phase short circuit. According to the invention, this difficulty is overcome by such a connection of the line protection relays that the voltage elements of the relays are excited by the delta voltages, and the current elements of the relays by the delta currents of the three-phase conductors. It will be shown in the description following hereinafter, that the relays will work correctly in the case of a two-phase short circuit, as well as of a three-phase short circuit.

Figure 1:
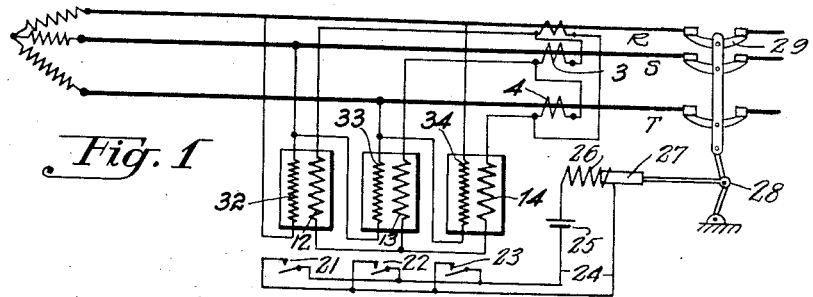
Figure 2:
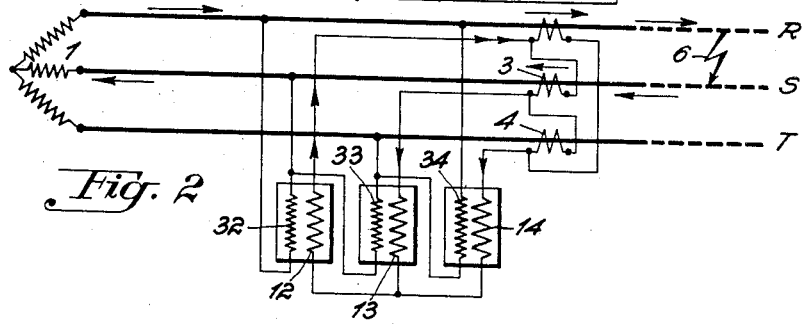
Figure 3:
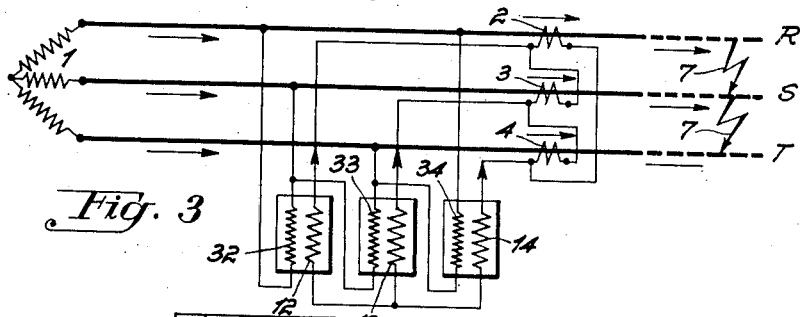
Figure 4:
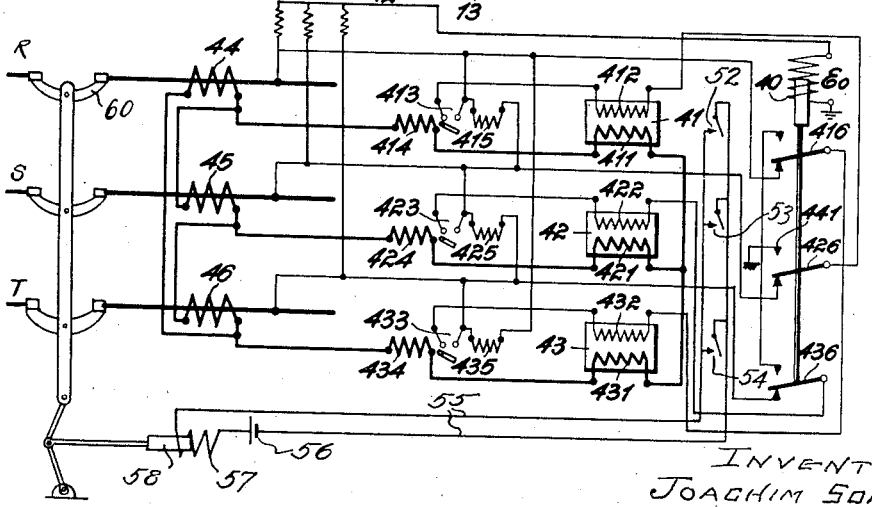

Reference is to be had to the accompanying drawings, in which Fig. 1 is a diagram showing one form or example of my invention; Figs. 2 and 3 are diagrams illustrating the operation or functioning of the apparatus shown in Fig. 1, in the event of a two-phase short circuit and of a three-phase short circuit respectively; and Fig. 4 is a diagram showing another example of my invention.

In Figure 1 there is shown an example for the connection according to the invention. The three conductors R, S, T are fed by the source of current 1. The secondary windings 2, 3, 4 of three current transformers are connected together in a triangle or delta, and connected to the current coils 12, 13, 14 of the three local fault relays. Through each current coil flows a current which corresponds to the delta current of two phases. To the voltage coils 32, 33 and 34 of the relays is connected the delta voltage of two phases, namely in such a manner that each voltage coil is connected to the delta voltage of the two phases the delta current of which flows through the current coil. The delta voltages can be obtained in a well known manner by direct connection to the phases or through voltage transformers.

The contacts operated by the three relays are indicated at 21, 22, 23, said contacts being shown as arranged in parallel in a circuit 24 which also includes a source of electricity 25 and a coil 26 to operate, by means of the core or armature 27 and the linkage 28, a cut-out switch 29 associated with the three conductors R, S, T.

In Figure 2 the fault currents in the case of a two-phase short circuit are shown in the diagram of connections. The short circuit 6 is assumed to be between the two phases R and S. These two phases are then traversed by one and the same fault current, but in opposite directions, as indicated by the arrows. The currents induced in the current transformers are also indicated by corresponding arrows. By examining the secondary circuit of the transformer, it will be seen that the relay coil 12 is traversed by the double fault current, and the relay coils 13 and 14 by the simple fault current. The relays 13 and 14 are of no importance for the fault location, as the voltage in their voltage coils 33 and 34 will drop only very little, if at all. The voltage coil 32 corresponding to the current coil 12, will on the contrary measure the collapsed delta voltage between the short circuited phases R and S. If now the quotient of the voltage and of the strength of current is indicated in some way by these two coils, this quotient will be the voltage between R and S, divided by the double current flowing in the fault circuit. The value indicated is therefore half of the resistance of the whole fault circuit, or in other words, the resistance of one-phase from the point at which the relay is located to the place of fault.

If the protective arrangement is also to give correct values in the case of a three-phase short circuit, the quotient indicated must be the resistance of a one-phase conductor. This case of a three-phase short circuit is illustrated in Figure 3. The three-phase short circuit 7 will cause, in each of the three phases R, S, T, the flow of equal currents having a phase displacement of 120° relatively to each other. The corresponding currents flow in the secondary windings 2, 3, 4 of the current transformers, and in the current coils 12, 13, 14 of the three relays flow the delta currents. As however the voltage coil of each relay is connected to the delta voltage of the phases, the delta current of which traverses the current coil of the relays, the quotient measured will be equal to the delta voltage divided by the delta current. This however will be in these cases the resistance of a one-phase conductor from the point at which the relay is located to the point of the fault.

In the relay arrangement according to Figures 1 and 3, the voltage coils 32, 33, 34 of the relays, which must still work fairly exactly even when the voltage has greatly dropped, are permanently connected to the full working voltage. In order to protect them from inadmissible heating, it has been attempted to avoid this. For this reason, certain prior devices make provision for closing the circuit for the voltage coils only when excessive current appears. In the new relay arrangement according to the invention this would however cause the danger that the voltage coils would be connected also to sound voltages, which is just what is to be avoided; for in the event of a short circuit, all the delta currents are increased to above the normal value, so that when excess current relays are used, all the voltage coils would be switched in.

For this reason, according to a further feature of the present invention, the voltage coils are switched in by means of auxiliary relays which, like the line protection relays, are operated by the ratio of the delta voltages and delta currents. These auxiliary relays can be however built in a substantially simpler manner, as when the voltage values drop to a great extent, the relays are no longer required to work exactly, on the contrary they are to become operative only as soon as a given value of the above mentioned ratio is exceeded.

By way of example, Figure 4 shows an arrangement embodying this additional feature of the invention. The three-phases of the three-phase current network are marked R, S and T. In order to indicate, or to switch off, a short circuit between the phases R and S, there is provided the line protection relay 41 with the current coil 411 and voltage coil 412. In the case of a short circuit between the phases S and T, the line protection relay 42 with the current coil 421 and voltage coil 422 will become operative, and in the event of a short circuit between the phases T and R the line protection relay 43 with the current coil 431 and voltage coil 432. Three current transformers 44, 45, 46 are connected in delta, and the delta currents are carried through the current coils 414, 424, 434 of the auxiliary relays and the current coils 411, 421, 431 of the line protection relays to a common star point. The voltage coil 412 of the line protection relay 41, is assumed to be connected to the phases R and S as the relay must become operative in the event of a short circuit between these two phases. The connection to the phase R is however broken by a switch 413 which is closed by the auxiliary relay only as soon as the ratio between the delta voltage R—S and the delta current, drops below a given limit. To that end, the auxiliary relay is provided with the current winding 414 and the voltage winding 415. The latter is so wound that it can remain permanently connected to the delta voltage. Its want of sensitiveness in the event of a particularly great drop in the voltage, can be put up with. When the switch 413 is closed by the auxiliary relay, the line protection relay 41 will become operative. It can work in such a manner that it will open the oil switches only when the fault is situated within the section to be protected or supervised, or it could determine the time of retardation with which the switches are to be opened.

The other end of the voltage coil 412 is also connected to its phase S not directly but through a switch 426. The latter is thrown over by an electromagnet 40 as soon as the voltage between the ground and the star point of the network has risen beyond a given amount, that is to say in other words when there is an earth closing or leak. If only a single-phase has an earth leak, the auxiliary relays will not become operative, and the throwing over of the switch 426 will have no importance. If however two-phases for instance R and S have an earth leak, the same effect will be produced as in the case of a short circuit. The correct working of the relays may be jeopardized in this case if both earth leaks are situated at different sides of the relay. In order to ensure the release of the correct oil switches in spite of that, in the event of a double earth leak, the voltage coil 412 is connected to the voltage of the phase R relatively to earth. As soon as the magnet 40 is excited under the ground leak conditions referred to above, the switch 426 will be laid against a contact 441 which is connected to earth.

The line protection relays 42 and 43 work in the same way as the line protection relay 41. Their voltage coils are connected to the respective phases by the switches 423 and 433 as soon as the auxiliary relays become operative, the current coils 424 and 434 of which are excited by the delta currents, and the voltage coils 425 and 435 of which are excited by the delta voltages. Whenever the relay or magnet 40 responds or becomes active, the other terminals of the voltage coils 422 and 432 are disconnected from the phases of the network by the switches 436 and 416 and connected to earth, since the said switches in this case are shifted to make contact with the conductor 51 connected with the grounded contact 441. The contacts controlled by the three relays 41, 42, 43 are indicated at 52, 53, and 54 respectively, and shown as arranged in parallel in a circuit 55 which also includes a source of electricity 56 and a coil 57 to operate, by means of the core or armature 58 and the linkage 59, a cut-out switch 60 associated with the three conductors R, S, T.

I claim:

1. A protective system for an electric line system of the three-phase type, comprising three line-protecting relays each associated with one of the three line conductors and each including a voltage element and a current element, and means for causing said elements to be energized respectively by the delta voltages and by the delta currents of said three-phase line conductors.

2. A system according to claim 1, in which each line-protecting relay is associated with the corresponding line conductor with the aid of an auxiliary relay responsive to a predetermined ratio between the respective delta current and delta voltage.

3. A system according to claim 1, in which there is provided an additional relay, connections to energize said relay whenever the voltage between the ground and the star point of the three-phase line system exceeds a predetermined limit, and switch mechanism controlled by said additional relay, said mechanism being so constructed and arranged that upon the energizing of said additional relay such mechanism will disconnect the voltage element from one phase of the three-phase system, and ground this element.

In testimony whereof I affix my signature.

JOACHIM SORGE.